(12) United States Patent
Sugimoto et al.

(10) Patent No.: US 11,777,088 B2
(45) Date of Patent: Oct. 3, 2023

(54) ANODE MATERIAL AND BATTERY USING SAME

(71) Applicant: Panasonic Intellectual Property Management Co., Ltd., Osaka (JP)

(72) Inventors: Yuta Sugimoto, Hyogo (JP); Izuru Sasaki, Kyoto (JP); Tatsuya Oshima, Osaka (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 336 days.

(21) Appl. No.: 16/930,415

(22) Filed: Jul. 16, 2020

(65) Prior Publication Data
US 2020/0350562 A1 Nov. 5, 2020

Related U.S. Application Data (63) Continuation of application No. PCT/JP2018/045587, filed on Dec. 12, 2018.

(30) Foreign Application Priority Data

Jan. 26, 2018 (JP) .................................. 2018-011529

(51) Int. Cl.
*H01M 4/48* (2010.01)
*H01M 4/485* (2010.01)
(Continued)

(52) U.S. Cl.
CPC ............ *H01M 4/48* (2013.01); *H01M 4/485* (2013.01); *H01M 4/62* (2013.01);
(Continued)

(58) Field of Classification Search
None
See application file for complete search history.

(56) References Cited

U.S. PATENT DOCUMENTS

| | | | | |
|---|---|---|---|---|
| 2003/0215716 A1* | 11/2003 | Suzuki | ................. | H01M 4/621 429/232 |
| 2012/0251889 A1* | 10/2012 | Janssen | ................. | H01M 4/587 252/502 |

(Continued)

FOREIGN PATENT DOCUMENTS

| EP | 3496202 A1 | 6/2019 |
|---|---|---|
| EP | 3736827 A1 | 11/2020 |

(Continued)

OTHER PUBLICATIONS

The Extended European Search Report dated Feb. 9, 2021 for the related European Patent Application No. 18902104.1.
(Continued)

*Primary Examiner* — Laura Weiner
(74) *Attorney, Agent, or Firm* — McDermott Will & Emery LLP (57) ABSTRACT

The present disclosure provides an anode material having further improved charge/discharge efficiency. The anode material according to the present disclosure includes an anode active material and a first solid electrolyte material. The first solid electrolyte material includes Li, M, and X, and does not include sulfur. M is at least one selected from the group consisting of metalloid elements and metal elements other than Li. X is at least one kind selected from the group consisting of Cl, Br, and I. The anode active material is an active material capable of storing and releasing lithium ions at a potential with respect to lithium of not less than 0.27 V.

8 Claims, 3 Drawing Sheets

(51) Int. Cl.
    *H01M 4/62*         (2006.01)
    *H01M 10/0525*    (2010.01)
    *H01M 10/0562*    (2010.01)
    *H01M 4/02*         (2006.01)

(52) U.S. Cl.
    CPC ... *H01M 10/0525* (2013.01); *H01M 10/0562* (2013.01); *H01M 2004/027* (2013.01); *H01M 2300/008* (2013.01)

(56) References Cited

U.S. PATENT DOCUMENTS

| | | |
|---|---|---|
| 2014/0377627 A1 | 12/2014 | Furuya et al. |
| 2019/0088995 A1 | 3/2019 | Asano et al. |

FOREIGN PATENT DOCUMENTS

| | | |
|---|---|---|
| JP | 2006-244734 | 9/2006 |
| JP | 2009-054596 | 3/2009 |
| JP | 4437890 B2 * | 3/2010 |
| JP | 2012-104280 | 5/2012 |
| JP | 2016-189339 | 11/2016 |
| KR | 10-2015-055890 A | 5/2015 |
| WO | 2018/025582 | 2/2018 |

OTHER PUBLICATIONS

International Search Report of PCT application No. PCT/JP2018/045587 dated Mar. 19, 2019.

Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

* cited by examiner

ANODE MATERIAL AND BATTERY USING SAME

BACKGROUND

1. Technical Field

The present disclosure relates to an anode material and a battery using the same.

2. Description of the Related Art

Patent Literature 1 discloses an all-solid battery including a solid electrolyte formed of a halide including indium.

CITATION LIST

Patent Literature

Patent Literature 1: Japanese Patent Application Publication No. 2006-244734

SUMMARY

An object of the present disclosure is to improve charge/discharge efficiency of a battery.

The present disclosure provides an anode material comprising:
an anode active material; and
a first solid electrolyte material,
wherein
the first solid electrolyte material includes Li, M, and X, and does not include sulfur;
M is at least one selected from the group consisting of metalloid elements and metal elements other than Li;
X is at least one selected from the group consisting of Cl, Br, and I; and
the anode active material is an active material capable of storing and releasing lithium ions at a potential with respect to lithium of not less than 0.27 V.

According to the present disclosure, the charge/discharge efficiency of the battery can be improved.

DETAILED DESCRIPTION OF THE EMBODIMENTS

Hereinafter, embodiments of the present disclosure will be described with reference to the drawings.

First Embodiment

The anode material in the first embodiment includes an anode active material and a first solid electrolyte material.

The first solid electrolyte material is a material represented by the following composition formula (1):

$$Li_\alpha M_\beta X_\gamma \quad \text{Formula (1)}$$

where
$\alpha$, $\beta$, and $\gamma$ are each independently a value greater than 0;
M includes at least one selected from the group consisting of metalloid elements and metal elements other than Li; and
X is at least one selected from the group consisting of Cl, Br, and I.

The anode active material is an active material capable of storing and releasing lithium ions at a potential with respect to lithium of not less than 0.27 V.

According to the above configuration, charge/discharge efficiency of a battery can be improved.

Figure 2:
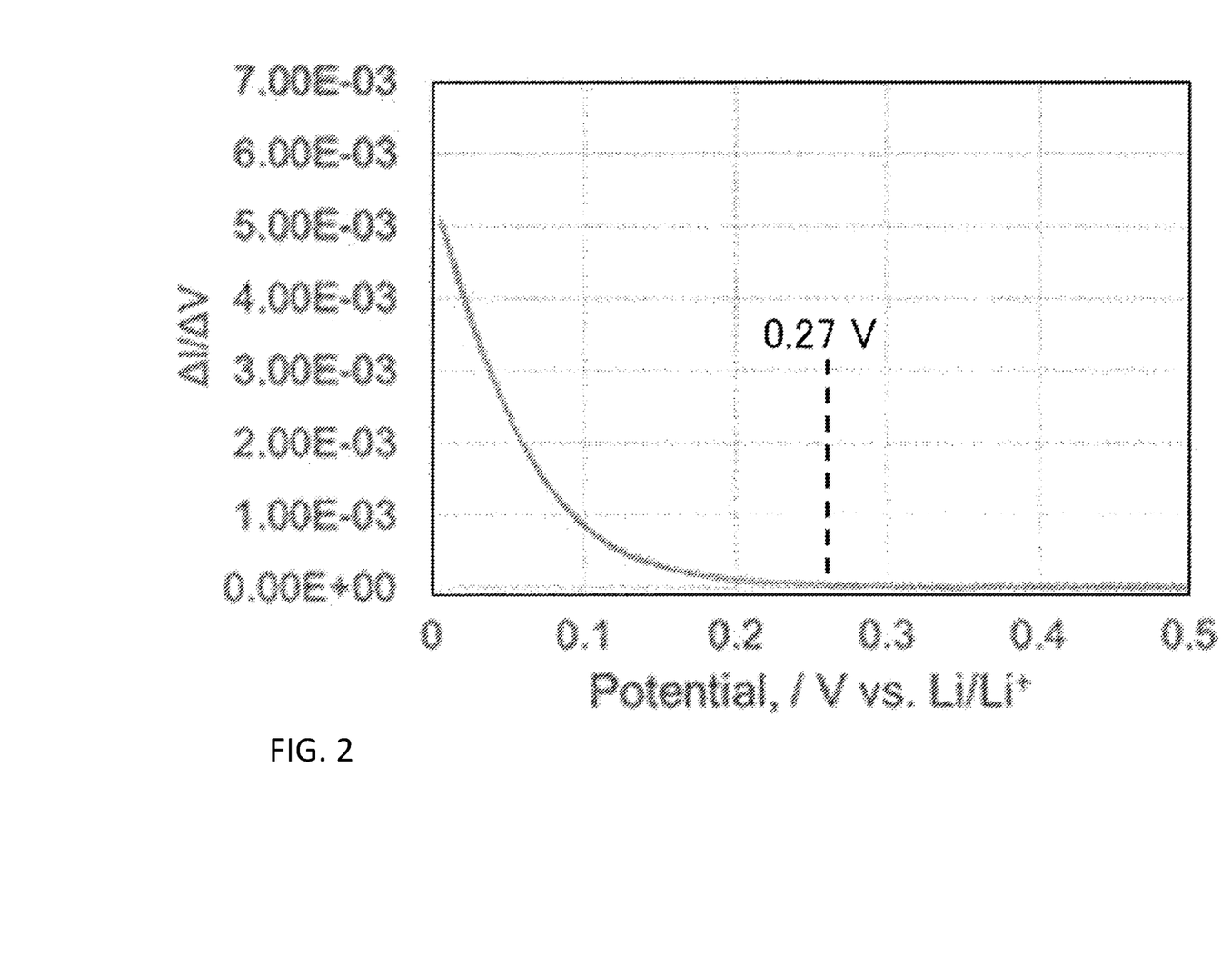
FIG. 2 is a graph showing reduction potential with respect to Li of a halide solid electrolyte in the inventive example 4.

FIG. 2 is a graph showing reduction potential with respect to a Li reference potential of a halide.

The halide is reduced at a Li reference potential of not more than 0.27 V. The reduction can be suppressed by using an anode active material capable of storing and releasing Li ions at a potential with respect to Li of not less than 0.27 V. Thereby, the charge/discharge efficiency can be improved.

The term "metalloid element" used in the present specification means at least one selected from the group consisting of B, Si, Ge, As, Sb, and Te.

The term "metal element" used in the present specification includes:

(i) all elements included in Groups 1 to 12 of the periodic table (except for hydrogen); and (ii) all elements included in Groups 13 to 16 of the periodic table (except for B, Si, Ge, As, Sb, Te, C, N, P, O, S, and Se).

In other words, each of the metal elements becomes a cation when the metal element forms an inorganic compound with a halogen compound.

In the composition formula (1), M may include Y (namely, yttrium). The first solid electrolyte material may include Y as the metal element M.

According to the above configuration, the ionic conductivity of the first solid electrolyte material can be further improved. Thereby, the charge/discharge efficiency of the battery can be further improved.

The first solid electrolyte material including Y may be, for example, a compound represented by the composition formula $Li_a Me_b Y_c X_6$ (where a+mb+3c=6, c>0, Me is at least one selected from the group consisting of metalloid elements and metal elements other than Li and Y, and m is a valence of Me).

As Me, at least one selected from the group consisting of Mg, Ca, Sr, Ba, Zn, Sc, Al, Ga, Bi, Zr, Hf, Ti, Sn, Ta, and Nb may be used.

According to the above configuration, the ionic conductivity of the first solid electrolyte material can be further improved.

The first solid electrolyte material may be $Li_3YCl_6$, $Li_3YBr_6$, $Li_{2.5}Y_{0.5}Zr_{0.5}Cl_6$, or $Li_3YBr_2Cl_2I_2$.

According to the above configuration, the ionic conductivity of the first solid electrolyte material can be further improved.

The first solid electrolyte material may be a material represented by the following composition formula (A1):

$$Li_{6-3d}Y_d X_6 \quad \text{Formula (A1)}$$

where, in the composition formula (A1), X is two or more kinds of elements selected from the group consisting of Cl, Br, and I.

In the composition formula (A1), 0<d<2 is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A2):

$$Li_3YX_6 \quad \text{Formula (A2)}$$

where, in the composition formula (A2), X is two or more kinds of elements selected from the group consisting of Cl, Br, and I.

In other words, d=1 may be satisfied in the composition formula (A1).

According to the above configuration, the ionic conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \quad \text{Formula (A3)}$$

where, in the composition formula (A3), $0<\delta\leq0.15$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \quad \text{Formula (A4)}$$

where, in the composition formula (A4), $0<\delta\leq0.25$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A5):

$$Li_{3-3\delta+a}Y_{1+\delta-a}Me_aCl_{6-x-y}Br_xI_y \quad \text{Formula (A5)}$$

where, in the composition formula (A5), Me is at least one selected from the group consisting of Mg, Ca, Sr, Ba, and Zn.

In the composition formula (A5),
$-1<\delta<2$;
$0<a<3$;
$0<(3-3\delta+a)$;
$0<(1+\delta -a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x-y}Br_xI_y \quad \text{Formula (A6)}$$

where, in the composition formula (A6), Me is at least one selected from the group consisting of Al, Sc, Ga, and Bi.

In the composition formula (A6),
$-1<\delta<1$;
$0<a<2$;
$0<(1+\delta -a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta-a}Me_aCl_{6-x-y}Br_xI_y \quad \text{Formula (A7)}$$

where, in the composition formula (A7), Me is at least one selected from the group consisting of Zr, Hf, and Ti.

In the composition formula (A7),
$-1<\delta<1$;
$0<a<1.5$;
$0<(3-3\delta-a)$;
$0<(1+\delta -a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A8):

$$Li_{a-3\delta-2a}Y_{1+\delta-a}Me_aCl_{6-x-y}Br_xI_y \quad \text{Formula (A8)}$$

where Me is at least one selected from the group consisting of Ta and Nb.

In the composition formula (A8),
$-1<\delta<1$;
$0<a<1.2$;
$0<(3-3\delta-2a)$;
$0<(1+\delta -a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ may be used.

The anode active material includes a material having a property of storing and releasing lithium ions at a potential with respect to Li of not less than 0.27 V.

As the anode active material, for example, a metal material, a carbon material, an oxide, a nitride, a tin compound, or a silicon compound may be used. The metal material may be a single metal. Alternatively, the metal material may be an alloy. Example of the metal material include indium metal and a lithium alloy. Examples of the oxide material include $Li_4Ti_5O_{12}$, $LiTi_2O_4$, and $TiO_2$.

The anode active material may include a titanium oxide or In (indium).

According to the above configuration, the charge/discharge efficiency of the battery can be further improved.

The anode active material may include lithium titanate.

According to the above configuration, the charge/discharge efficiency of the battery can be further improved.

Figure 1:
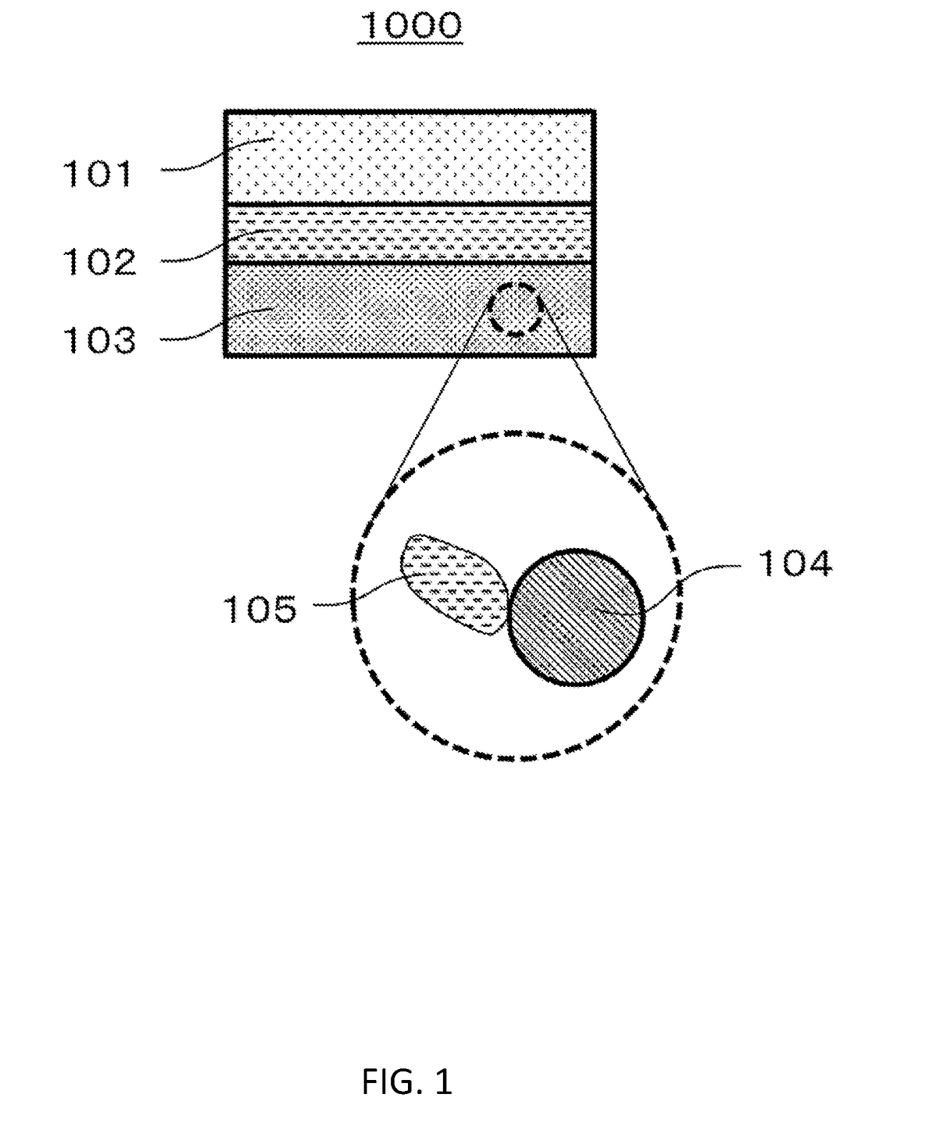
FIG. 1 shows a cross-sectional view of a battery 1000 in a second embodiment.

The anode material in the first embodiment may include anode active material particles 104 and first solid electrolyte particles 105, as shown in FIG. 1.

In addition, the shape of each of the first solid electrolyte particles 105 is not limited. An example of the shape of each of the first solid electrolyte particles 105 is an acicular shape, an acicular shape, or an elliptically spherical shape. For example, the shape of each of the first solid electrolyte particles 105 may be particulate.

The median diameter of the anode active material particles 104 may be not less than 0.1 μm and not more than 100 μm. If the median diameter of the anode active material particles 104 is less than 0.1 μm, the anode active material particles 104 and the first solid electrolyte particles 105 do not disperse well in the anode, so that the charge/discharge characteristic of the battery may be decreased. If the median diameter of the anode active material particles 104 is more than 100 μm, the rate at which lithium diffuses in the anode active material particles 104 may be decreased. As a result, it may be difficult to operate the battery at a high output.

The median diameter of the anode active material particles 104 may be larger than the median diameter of the first solid electrolyte particles 105. Thereby, a good dispersion state of the anode active material particles 104 and the first solid electrolyte particles 105 can be formed.

In the anode material in the first embodiment, the first solid electrolyte particles 105 and the anode active material particles 104 may be in contact with each other, as shown in FIG. 1.

In addition, the anode material in the first embodiment may include a plurality of the first solid electrolyte particles 105 and a plurality of the anode active material particles 104.

In addition, in the anode material in the first embodiment, the content of the first solid electrolyte particles 105 may be the same as or different from the content of the anode active material particles 104.

<Manufacturing Method of First Solid Electrolyte Material>

The first solid electrolyte material in the first embodiment may be manufactured by the following method, for example.

In consideration of the composition ratio of the product, binary halide raw material powders are prepared. For example, for synthesis of $Li_3YCl_6$, LiCl and $YCl_3$ are prepared at a molar ratio of 3:1.

At this time, by selecting the kinds of the raw material powders, the elements "M", "Me", and "X" in the above composition formulas can be determined. In addition, by adjusting the raw material powders, the blending ratio, and the synthesis process, the values of "α", "δ", "γ", "d", "δ", "a", "x", and "y" are determined.

The raw material powders are mixed well. Next, the raw material powders are ground by a mechanochemical milling method. In this way, the raw material powders react to provide the first solid electrolyte material. Alternatively, the raw material powders may be mixed well, and then, sintered in vacuum to provide the first solid electrolyte material.

Thereby, the above-mentioned solid electrolyte material including a crystal phase is provided.

The configuration of the crystal phase (namely, the crystal structure) in the solid electrolyte material may be determined by selecting the reaction method and reaction conditions of the raw material powders.

Second Embodiment

Hereinafter, the second embodiment will be described. The description which has been set forth in the first embodiment is omitted as appropriate.

FIG. 1 shows a cross-sectional view of a battery 1000 in the second embodiment.

The battery 1000 in the second embodiment comprises a cathode 101, an electrolyte layer 102, and an anode 103.

The electrolyte layer 102 is disposed between the cathode 101 and the anode 103.

The anode 103 includes the anode material in the first embodiment.

According to the above configuration, the charge/discharge efficiency of the battery can be improved.

The halide is reduced at a Li reference potential of not more than 0.27 V. The reduction can be suppressed by using an anode active material capable of storing and releasing Li ions at a potential with respect to Li of not less than 0.27 V. Thereby, the charge/discharge efficiency can be improved.

In the anode 103, a volume ratio Vn representing a volume of the anode active material particles 104 to the total volume of the anode active material particles 104 and the first solid electrolyte particles 105 may be not less than 0.3 and not more than 0.95. If the volume ratio Vn is less than 0.3, it may be difficult to ensure a sufficient energy density of the battery. On the other hand, if the volume ratio Vn is more than 0.95, it may be difficult to operate the battery at a high output.

The thickness of the anode 103 may be not less than 10 μm and not more than 500 μm. If the thickness of the anode is less than 10 μm, it may be difficult to ensure a sufficient energy density of the battery. In addition, if the thickness of the anode is more than 500 μm, operation at high output may be difficult.

The cathode 101 includes a material having a property of storing and releasing metal ions (for example, lithium ions). The cathode 101 may include a cathode active material.

Examples of the cathode active material include:
lithium-containing transition metal oxides (for example, $Li(NiCoAl)O_2$, $Li(NiCoMn)O_2$, or $LiCoO_2$);
transition metal fluorides;
polyanion materials;
fluorinated polyanion materials;
transition metal sulfides;
transition metal oxysulfides; and
transition metal oxynitrides.

In particular, if a lithium-containing transition metal oxide is used as the cathode active material, reduction in manufacturing cost can be achieved and an average discharge voltage can be increased.

The cathode 101 may include a solid electrolyte material. According to the above configuration, conductivity of lithium ions inside the cathode 101 is increased to allow the operation at a high output.

The solid electrolyte material may be a halide solid electrolyte, a sulfide solid electrolyte, an oxide solid electrolyte, a polymer solid electrolyte, or a complex hydride solid electrolyte.

As the halide solid electrolyte, for example, the materials exemplified as the above-mentioned first solid electrolyte material may be used.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ may be used. In addition, LiX (X: F, Cl, Br, I), $Li_2O$, $MO_q$, $Li_pMO_q$ (M: any of P, Si, Ge, B, Al, Ga, In, Fe, or Zn) (p, q: natural number) may be added thereto.

As the oxide solid electrolyte, for example,
a NASICON solid electrolyte such as $LiTi_2(PO_4)_3$ and its element substitution products;
a $(LaLi)TiO_3$-based perovskite solid electrolyte;
a LISICON solid electrolyte such as $Li_{14}ZnGe_4O_{16}$, $Li_4SiO_4$, or $LiGeO_4$ and their element substitution products;
a garnet solid electrolyte such as $Li_7La_3Zr_2O_{12}$ and its element substitution products;

Li$_3$N and its H substitution products;
Li$_3$PO$_4$ and its N substitution products;
glass using a Li—B—O compound such as LiBO$_2$ or Li$_3$BO$_3$ as the base thereof to which Li$_2$SO$_4$ or Li$_2$CO$_3$ has been added; or
glass ceramics
may be used.

As the polymer solid electrolyte, for example, a compound of a polymer compound and a lithium salt can be used. The polymer compound may have an ethylene oxide structure. Since the polymer electrolyte having an ethylene oxide structure can include a large amount of lithium salt, the ionic conductivity can be further increased. As the lithium salt, LiPF$_6$, LiBF$_4$, LiSbF$_6$, LiAsF$_6$, LiSO$_3$CF$_3$, LiN(SO$_2$CF$_3$)$_2$, LiN(SO$_2$C$_2$F$_5$)$_2$, LiN(SO$_2$CF$_3$)(SO$_2$C$_4$F$_9$), or LiC(SO$_2$CF$_3$)$_3$ may be used. As the lithium salt, one lithium salt selected from these may be used alone. Alternatively, a mixture of two or more kinds of lithium salts selected from these may be used as the lithium salt.

As the complex hydride solid electrolyte, for example, LiBH$_4$—LiI or LiBH$_4$—P$_2$S$_5$ may be used.

The median diameter of the cathode active material particles may be not less than 0.1 μm and not more than 100 μm. If the median diameter of the cathode active material is less than 0.1 μm, a possibility that the cathode active material particles and the solid electrolyte material fail to form a good dispersion state in the cathode 101 arises. Thereby, the charge/discharge characteristic of the battery is decreased. On the other hand, if the median diameter of the cathode active material is larger than 100 μm, diffusion of lithium in the cathode active material particles is made slow. As a result, it may be difficult to operate the battery at a high output.

The median diameter of the cathode active material particles may be larger than the median diameter of the solid electrolyte material. Thereby, a good dispersion state of the cathode active material particles and the solid electrolyte material can be formed.

In the cathode 101, a volume ratio Vp representing a volume of the cathode active material particles to the total volume of the cathode active material particles and the solid electrolyte material may be not less than 0.3 and not more than 0.95. If the volume ratio Vp is less than 0.3, it may be difficult to ensure a sufficient energy density of the battery. On the other hand, if the volume ratio Vp is more than 0.95, it may be difficult to operate the battery at a high output.

The thickness of the cathode 101 may be not less than 10 μm and not more than 500 μm. If the thickness of the cathode is less than 10 μm, it may be difficult to ensure a sufficient energy density of the battery. In addition, if the thickness of the cathode is more than 500 μm, it may be difficult to operate at a high output.

The cathode active material may be coated. As the coating material, a material having low electronic conductivity may be used. An oxide material or an oxide solid electrolyte can be used as the coating material.

As the oxide material, for example, SiO$_2$, Al$_2$O$_3$, TiO$_2$, B$_2$O$_3$, Nb$_2$O$_5$, WO$_3$, or ZrO$_2$ may be used. Examples of the oxide solid electrolyte include:
Li—Nb—O compounds such as LiNbO$_3$;
Li—B—O compounds such as LiBO$_2$ or Li$_3$BO$_3$;
Li—Al—O compounds such as LiAlO$_2$;
Li—Si—O compounds such as Li$_4$SiO$_4$;
Li$_2$SO$_4$;
Li—Ti—O compounds such as Li$_4$Ti$_5$O$_{12}$;
Li—Zr—O compounds such as Li$_2$ZrO$_3$;
Li—Mo—O compounds such as Li$_2$MoO$_3$;
Li-V-O compounds such as LiV$_2$O$_5$; and
Li—W—O compounds such as Li$_2$WO$_4$.

The oxide solid electrolyte has high ionic conductivity and high potential stability. For this reason, the charge/discharge efficiency can be further improved by using an oxide solid electrolyte.

As the solid electrolyte material included in the electrolyte layer 102, the above-described materials (for example, the halide solid electrolyte, the sulfide solid electrolyte, the oxide solid electrolyte, the polymer solid electrolyte, the complex hydride solid electrolyte, etc.) may be used.

The electrolyte layer 102 may include a solid electrolyte material as a main component. In other words, the electrolyte layer 102 may include the solid electrolyte material, for example, at a weight ratio of not less than 50% (not less than 50% by weight) with respect to the entire electrolyte layer 102.

According to the above configuration, the charge/discharge characteristic of the battery can be further improved.

In addition, the electrolyte layer 102 may include the solid electrolyte material, for example, at a weight ratio of not less than 70% (not less than 70% by weight) with respect to the entire electrolyte layer 102.

According to the above configuration, the charge/discharge characteristic of the battery can be further improved.

The electrolyte layer 102 may further include inevitable impurities. The electrolyte layer 102 may include the starting materials used for the synthesis of the solid electrolyte material. The electrolyte layer 102 may include by-products or decomposition products generated when the solid electrolyte material is synthesized.

The weight ratio of the solid electrolyte material included in the electrolyte layer 102 to the electrolyte layer 102 may be substantially 1. "The weight ratio is substantially 1" means that the weight ratio calculated without considering the inevitable impurities that may be included in the electrolyte layer 102 is 1. In other words, the electrolyte layer 102 may be composed only of a solid electrolyte material.

According to the above configuration, the charge/discharge characteristic of the battery can be further improved.

As described above, the electrolyte layer 102 may be composed only of a solid electrolyte material.

The electrolyte layer 102 may include two or more kinds of the materials described as the solid electrolyte material. For example, the electrolyte layer 102 may include the first solid electrolyte material and the sulfide solid electrolyte material.

The thickness of the electrolyte layer 102 may be not less than 1 μm and not more than 300 μm. If the thickness of the electrolyte layer 102 is less than 1 μm, the possibility that the cathode 101 and the anode 103 are short-circuited increases. In addition, if the thickness of the electrolyte layer 102 is more than 300 μm, it may be difficult to operate at a high output.

At least one of the cathode 101, the electrolyte layer 102, and the anode 103 may include a binder for the purpose of improving adhesion between the particles. The binder is used in order to improve the binding property of the material which forms the electrode.

An example of the material of the binder is poly(vinylidene fluoride), polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose.

As the binder, a copolymer of two or more kinds of materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used.

Two or more kinds of the binders may be used.

At least one of the cathode 101 and the anode 103 may include a conductive agent for the purpose of increasing the electronic conductivity.

An example of the conductive agent is graphite such as natural graphite or artificial graphite;
carbon black such as acetylene black or ketjen black;
a conductive fiber such as a carbon fiber or a metal fiber;
carbon fluoride;
metal powder such as aluminum;
conductive whiskers such as zinc oxide or potassium titanate;
a conductive metal oxide such as titanium oxide; or
a conductive polymer compound such as polyaniline, polypyrrole, or polythiophene.

Cost reduction can be achieved by using a carbon conductive agent.

An example of the shape of the battery in the second embodiment is a coin, a cylinder, a prism, a sheet, a button, a flat type, or a stacking structure.

EXAMPLES

Hereinafter, details of the present disclosure will be described with reference to inventive examples and comparative examples.

Inventive Example 1

[Production of First Solid Electrolyte Material]

In an argon glove box having a dew point of −60° C. or less, raw material powders LiCl and $YCl_3$ were prepared at a molar ratio of $LiCl:YCl_3=3:2$. Subsequently, milling processing was performed at 600 rpm for 25 hours using a planetary ball mill (manufactured by Fritsch, type P-7) to provide a powder of the first solid electrolyte material $Li_3YCl_6$ according to the inventive example 1.

[Production of Sulfide Solid Electrolyte Material]

In an argon glove box having a dew point of −60° C. or less, $Li_2S$ and $P_2S_5$ were prepared at a molar ratio of $Li_2S:P_2S_5=75:25$. These were ground and mixed in a mortar. Subsequently, milling processing was performed at 510 rpm for 10 hours using a planetary ball mill (manufactured by Fritsch, type P-7) to provide a glassy solid electrolyte. The glassy solid electrolyte was heat-treated at 270° C. for 2 hours in an inert atmosphere. In this way, a glass-ceramic sulfide solid electrolyte material $Li_2S-P_2S_5$ was provided.

[Production of Anode Material]

In an argon glove box, the first solid electrolyte material of the inventive example 1, the anode active material $Li_4Ti_5O_{12}$, and a conductive agent VGCF were prepared at a weight ratio of 28.3:66.5:5.7. By mixing these in an agate mortar, the anode material of the inventive example 1 was produced.

The anode active material $Li_4Ti_5O_{12}$ is an active material capable of storing and releasing lithium ions at a potential with respect to lithium of 1.5 V. This value was measured by the following method.

In other words, in an insulating outer cylinder, 40 mg of the anode material, 100 mg of the solid electrolyte material, and Li foil were stacked in this order. This was press-molded at a pressure of 360 MPa to produce a stacking structure. Next, stainless steel current collectors were placed on the upper and lower parts of the stacking structure, and current collector leads were attached to the current collectors. Finally, an insulating ferrule was used to block and seal the inside of the insulating outer cylinder from the outside air atmosphere. In this way, a reduction potential measurement cell was produced.

[Measurement of Li Store/Release Potential]

Measurement of store/release potential of the anode active material $Li_4Ti_5O_{12}$ was performed under the following conditions. The reduction potential measurement cell was placed in a thermostatic chamber at 25° C. Li store/release potential was measured by charging and discharging at a Li reference potential within a range of 1 V to 2.5 V by a constant current charge/discharge measurement.

[Production of Secondary Battery]

In an insulating outer cylinder, 40 mg of the anode material and 80 mg of the sulfide solid electrolyte material of the inventive example 1 were stacked in this order. This was pressure-molded at a pressure of 360 MPa to produce a stacking structure composed of an anode and an electrolyte layer.

Next, a metal In (thickness: 200 μm) was stacked on the surface of the solid electrolyte layer opposite to the other surface which was in contact with the anode. This was pressure-molded at a pressure of 80 MPa to produce a stacking structure composed of a cathode, the solid electrolyte layer, and the anode.

Next, stainless steel current collectors were placed on the upper and lower parts of the stacking structure, and current collector leads were attached to the current collectors.

Finally, an insulating ferrule was used to block and seal the inside of the insulating outer cylinder from the outside air atmosphere. In this way, a battery according to the inventive example 1 was produced.

Inventive Example 2

[Production of First Solid Electrolyte Material]

In an argon glove box with a dew point of −60° C. or lower, raw material powders LiBr and $YBr_3$ were prepared at a molar ratio of $LiBr:YBr_3=3:2$. Subsequently, milling processing was performed at 600 rpm for 25 hours using a planetary ball mill (manufactured by Fritsch, type P-7) to provide a powder of the first solid electrolyte material $Li_3YBr_6$.

A secondary battery of the inventive example 2 was produced in the same manner as in the inventive example 1, except that the first solid electrolyte material of the inventive example 2 was used for the anode.

Inventive Example 3

[Production of First Solid Electrolyte Material]

In an argon glove box with a dew point of −60° C. or lower, raw material powders LiCl, $YCl_3$, and $ZrCl_4$ were prepared at a molar ratio of $LiCl:YCl_3:ZrCl_4=2.5:0.5:0.5$. Subsequently, milling processing was performed at 600 rpm for 25 hours using a planetary ball mill (manufactured by Fritsch, type P-7) to provide a powder of the first solid electrolyte material $Li_{2.5}Y_{0.5}Zr_{0.5}Cl_6$.

A secondary battery was produced in the same manner as in the inventive example 1, except that the first solid electrolyte material of the inventive example 3 was used for the anode.

Inventive Example 4

[Production of First Solid Electrolyte Material]

In an argon glove box with a dew point of −60° C. or lower, raw material powders LiBr, LiCl, LiI, YCl$_3$, and YBr$_3$ were prepared at a molar ratio of LiBr:LiCl:LiI:YCl$_3$:YBr$_3$=1:1:4:1:1. Subsequently, milling processing was performed at 600 rpm for 25 hours using a planetary ball mill (manufactured by Fritsch, type P-7) to provide a powder of the first solid electrolyte material Li$_3$YBr$_2$Cl$_2$I$_2$.

A secondary battery was produced in the same manner as in the inventive example 1, except that the first solid electrolyte material of the inventive example 4 was used for the anode.

Inventive Example 5

[Production of Cathode Material]

In an argon glove box, the first solid electrolyte material Li$_3$YCl$_6$ of the inventive example 1 and Li(NiCoMn)O$_2$ (hereinafter, referred to as NCM) were prepared at a weight ratio of 30:70. By mixing these in an agate mortar, the cathode material of the inventive example 5 was produced.

In an insulating outer cylinder, 40 mg of the cathode material of the inventive example 5 and 80 mg of the sulfide solid electrolyte material of the inventive example 1 were stacked in this order. This was pressure-molded at a pressure of 360 MPa to produce a stacking structure composed of a cathode and an electrolyte layer.

Next, a metal In (thickness: 200 μm) was stacked on the surface of the solid electrolyte layer opposite to the other surface which was in contact with the cathode. This was pressure-molded at a pressure of 80 MPa to produce a stacking structure composed of the cathode, the solid electrolyte layer, and an anode.

The metal In stores and releases lithium ions at a potential with respect to lithium of 0.62 V. This value was measured in the same manner as in the inventive example 1.

Next, stainless steel current collectors were arranged on the upper and lower parts of the stacking structure, and current collector leads were attached to the current collectors.

Finally, an insulating ferrule was used to block and seal the inside of the insulating outer cylinder from the outside air atmosphere. In this way, a battery according to the inventive example 5 was produced.

Comparative Example

[Production of Anode Material]

In an argon glove box, the first solid electrolyte material of the inventive example 1 and graphite, which was an anode active material, were prepared at a weight ratio of 60:40. By mixing these with an agate mortar, the anode material of the comparative example was produced.

Graphite stores and releases lithium ions at a potential with respect to lithium of 0.1 V. This value was measured in the same manner as in the inventive example 1.

A secondary battery according to the comparative example was produced in the same manner as in the inventive example 1, except that the anode material of the comparative example was used for the anode.

[Charge/Discharge Test]

A charge/discharge test was conducted as below, using each of the batteries of the inventive examples 1 to 4.

The battery was disposed in a thermostatic chamber at 25° C.

The battery was charged with a constant current at a current value of 70 μA, and the charge was terminated at a potential with respect to Li of 1.0 V.

Next, the battery was discharged at a current value of 70 μA and the discharge was terminated at a potential with respect to Li of 2.5 V.

Using the battery of the inventive example 5, a charge/discharge test was performed as below.

The battery was disposed in a thermostatic chamber at 25° C.

The battery was charged with a constant current at a current value of 70 μA and the charge was terminated at a potential with respect to Li of 4.2 V.

Next, the battery was discharged at a current value of 70 μA and the discharge was terminated at a potential with respect to Li of 2.5 V.

A charge/discharge test was performed under the following conditions, using the battery of the comparative example.

The battery was disposed in a thermostatic chamber at 25° C. The battery was charged with a constant current at a current value of 70 μA, and the charge was terminated at a potential with respect to Li of 0.0 V.

Next, the battery was discharged at a current value of 70 μA and the discharge was terminated at a potential with respect to Li of 2.5 V.

On the basis of the above charge/discharge results, the initial charge/discharge efficiency (=initial discharge capacity/initial charge capacity) of each of the batteries of the inventive examples 1 to 5 and the comparative example were provided. The results are shown in Table 1 below.

TABLE 1

| | Anode layer | | |
| --- | --- | --- | --- |
| | Anode active material | Solid electrolyte | Charge/discharge efficiency (%) |
| Inventive Example 1 | Li$_4$Ti$_5$O$_{12}$ | Li$_3$YCl$_6$ | 99.1 |
| Inventive Example 2 | Li$_4$Ti$_5$O$_{12}$ | Li$_3$YBr$_6$ | 97.3 |
| Inventive Example 3 | Li$_4$Ti$_5$O$_{12}$ | Li$_{2.5}$Y$_{0.5}$Zr$_{0.5}$Cl$_6$ | 93.4 |
| Inventive Example 4 | Li$_4$Ti$_5$O$_{12}$ | Li$_3$YBr$_2$Cl$_2$I$_2$ | 96.6 |
| Inventive Example 5 | In | — | 89.1 |
| Comparative Example | Graphite | Li$_3$YCl$_6$ | 77.9 |

<<Discussion>>

Figure 3:
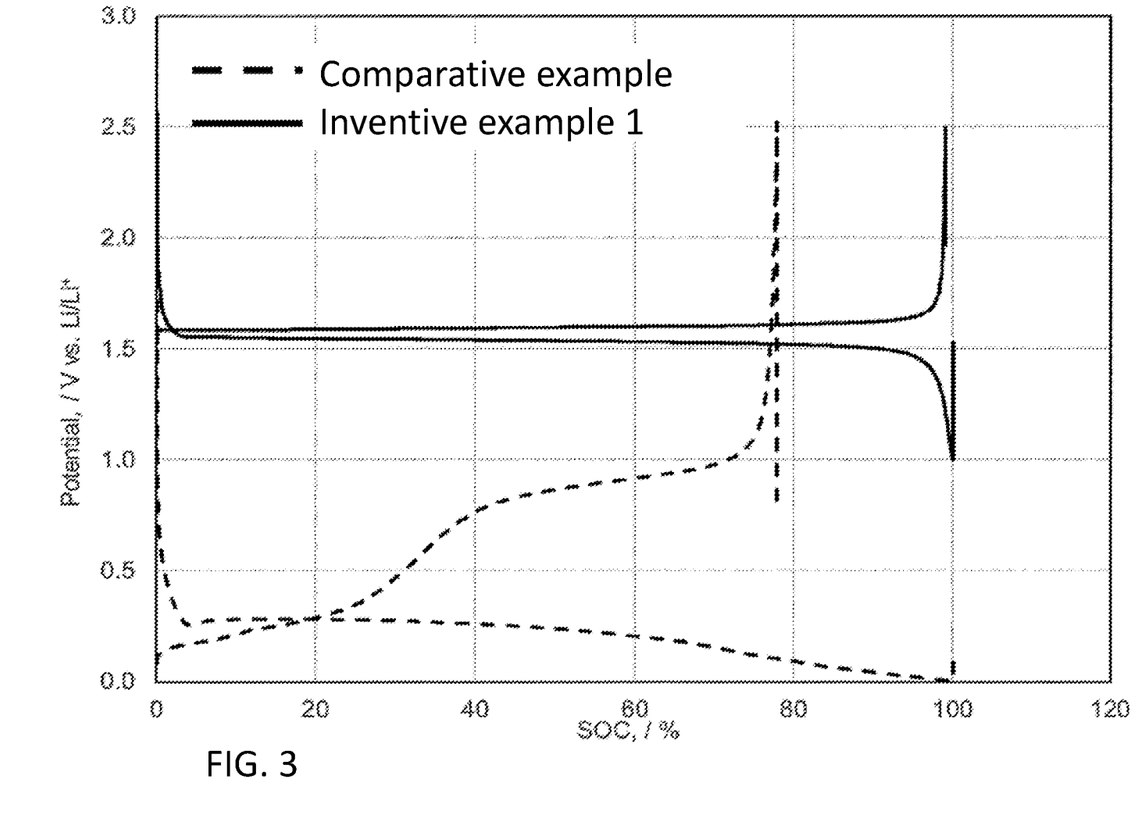
FIG. 3 is a graph showing an initial charge/discharge characteristic of all-solid batteries in the inventive example 1 and the comparative example.

FIG. 3 is a graph showing the initial charge/discharge characteristic of the all-solid batteries in the inventive example 1 and the comparative example.

From the results of the inventive example 1 and the comparative example shown in FIG. 3 and Table 1, it was confirmed that the reduction of the halide solid electrolyte was suppressed by using the active material capable of storing and releasing Li ions at a potential with respect to Li of not less than 0.27 V for the anode, and that the charge/discharge efficiency was improved.

From the results of the inventive examples 1 to 5 and the comparative example shown in Table 1, a similar effect was confirmed for the halide solid electrolytes other than $Li_3YCl_6$ and for the anode material other than $Li_4Ti_5O_{12}$.

INDUSTRIAL APPLICABILITY

The battery of the present disclosure can be used as, for example, an all-solid lithium secondary battery.

REFERENTIAL SIGNS LIST

1000 Battery
101 Cathode
102 Electrolyte layer
103 Anode
104 Anode active material particle
105 First solid electrolyte particle

The invention claimed is:

1. An anode material, comprising:
an anode active material comprising at least one selected from the group consisting of indium metal, titanium oxide, and lithium titanate; and
a first solid electrolyte material represented by the following composition formula:

$$Li_aMe_bY_cX_6,$$

wherein
Me is at least one selected from the group consisting of Mg, Ca, Sr, Ba, Zn, Sc, Al, Ga, Bi, Zr, Hf, Ti, Sn, Ta, and Nb,
X is at least one selected from the group consisting of Cl, Br, and I,
a+mb+3c=6, a>0, b≥0 and c>0 are satisfied, and
m represents a valence of Me.

2. The anode material according to claim 1, wherein the first solid electrolyte material is
$Li_3YCl_6$,
$Li_3YBr_6$,
$Li_{2.5}Y_{0.5}Zr_{0.5}Cl_6$, or
$Li_3YBr_2Cl_2I_2$.

3. The anode material according to claim 1, wherein Me is Zr.

4. The anode material according to claim 1, wherein the first solid electrolyte material is represented by the following composition formula:

$$Li_{6-3c}Y_cX_6 \text{ or } Li_{2.5}Y_{0.5}Zr_{0.5}Cl_6,$$

where 0<c<2 is satisfied.

5. The anode material according to claim 1, wherein the anode active material comprises lithium titanate.

6. The anode material according to claim 5, wherein the lithium titanate comprises $Li_4Ti_5O_{12}$.

7. A battery comprising:
an anode comprising the anode material according to claim 1;
a cathode; and
an electrolyte layer comprising a sulfide solid electrolyte provided between the cathode and the anode.

8. A battery comprising:
an anode comprising the anode material according to claim 1;
a cathode; and
an electrolyte layer comprising the first solid electrolyte material provided between the cathode and the anode.

* * * * *